US010686951B2

(12) United States Patent
Matysiak et al.

(10) Patent No.: US 10,686,951 B2
(45) Date of Patent: Jun. 16, 2020

(54) METHODS AND SYSTEMS FOR ACCESSING PRINTING AND SCANNING FUNCTIONS OF A MULTI-FUNCTION PRINTER THROUGH NATURAL LANGUAGE TEXT OR VOICE MESSAGES

(71) Applicant: Kyocera Document Solutions Development America, Inc., Concord, CA (US)

(72) Inventors: Jacek Joseph Matysiak, Concord, CA (US); Dilinur Wushour, Concord, CA (US)

(73) Assignee: Kyocera Document Solutions Development America, Inc., Concord, CA (US)

( * ) Notice: Subject to any disclaimer, the term of this patent is extended or adjusted under 35 U.S.C. 154(b) by 0 days.

(21) Appl. No.: 15/936,653

(22) Filed: Mar. 27, 2018

(65) Prior Publication Data

US 2019/0306341 A1 Oct. 3, 2019

(51) Int. Cl.
*G06F 3/12* (2006.01)
*H04N 1/00* (2006.01)
*H04L 12/58* (2006.01)
*H04L 29/06* (2006.01)
*H04L 29/08* (2006.01)

(52) U.S. Cl.
CPC ....... *H04N 1/00403* (2013.01); *G06F 3/1231* (2013.01); *G06F 3/1292* (2013.01); *H04L 51/046* (2013.01); *H04L 67/10* (2013.01); *H04L 67/38* (2013.01)

(58) Field of Classification Search
None
See application file for complete search history.

(56) References Cited

U.S. PATENT DOCUMENTS

| 7,528,981 B2 * | 5/2009 | Johnson ............ G06F 11/0733 |
| | | 358/1.15 |
| 9,104,344 B2 * | 8/2015 | Ganesan ............ G06F 3/1207 |
| 9,432,527 B2 | 8/2016 | Park et al. |
| 2004/0126167 A1 | 7/2004 | Roosen et al. |

(Continued)

OTHER PUBLICATIONS

U.S. Appl. No. 15/936,701, filed Mar. 27, 2018, Matysiak et al.

(Continued)

*Primary Examiner* — Mohammad H Ghayour
*Assistant Examiner* — Pawan Dhingra
(74) *Attorney, Agent, or Firm* — Sheridan Ross P.C.

(57) ABSTRACT

Embodiments of the disclosure provide for controlling functions of a Multi-Function Printer (MFP) by receiving a text or voice message expressed in natural language and received by the one or more servers from a mobile device of the user of the MFP, extracting text data or audio data of the received text or voice message, forwarding the extracted text data or audio data of the received text or voice message to the one or more servers, receiving, from the one or more servers, one or more entities or intents related to the text or voice message based on processing of the text data or audio data by the one or more servers, processing the entities or intents to determine one or more functions related to the text or voice message from the mobile device of the user of the MFP, and performing the determined one or more functions.

20 Claims, 6 Drawing Sheets

(56) References Cited

U.S. PATENT DOCUMENTS

| | | | |
|---|---|---|---|
| 2006/0045544 A1* | 3/2006 | Kim | G03G 15/5075 |
| | | | 399/8 |
| 2006/0190537 A1* | 8/2006 | Morris | G06Q 10/10 |
| | | | 709/204 |
| 2009/0207449 A1 | 8/2009 | Johnson et al. | |
| 2010/0046015 A1 | 2/2010 | Whittle et al. | |
| 2012/0218589 A1* | 8/2012 | Watanabe | G06F 3/1205 |
| | | | 358/1.15 |
| 2014/0320888 A1* | 10/2014 | Baek | G06F 21/335 |
| | | | 358/1.14 |
| 2015/0055171 A1* | 2/2015 | Joo | G06F 3/00 |
| | | | 358/1.15 |
| 2015/0172505 A1* | 6/2015 | Park | H04N 1/00307 |
| | | | 358/1.15 |
| 2016/0050263 A1* | 2/2016 | Hwang | H04L 51/04 |
| | | | 709/206 |
| 2016/0050326 A1* | 2/2016 | Lee | H04N 21/2223 |
| | | | 358/402 |
| 2016/0070273 A1 | 3/2016 | Caskey et al. | |
| 2016/0330336 A1 | 11/2016 | Park et al. | |
| 2018/0075254 A1 | 3/2018 | Reid et al. | |
| 2019/0050738 A1* | 2/2019 | Sivagnanam | G06N 5/003 |

OTHER PUBLICATIONS

U.S. Appl. No. 15/936,736, filed Mar. 27, 2018, Matysiak et al.
Official Action for U.S. Appl. No. 15/936,701, dated Nov. 30, 2018, 17 pages.

\* cited by examiner

METHODS AND SYSTEMS FOR ACCESSING PRINTING AND SCANNING FUNCTIONS OF A MULTI-FUNCTION PRINTER THROUGH NATURAL LANGUAGE TEXT OR VOICE MESSAGES

FIELD OF THE DISCLOSURE

Embodiments of the present disclosure relate generally to methods and systems for accessing and controlling functions of a Multi-Function Printer (MFP) and more particularly to providing natural language access and control of the functions of the MFP through a chat session conducted via a mobile device.

BACKGROUND

Multi-Function Printers (MFPs) are common and well-known pieces of office equipment and can be found in most, if not all, offices and libraries, and even in many homes. These devices can offer the ability to print, scan, fax, and otherwise process documents in a wide variety of formats and in a number of different ways, e.g., one-sided or two-sided printing or scanning, color or grey-scale printing or scanning, printing or scanning with various levels of resolution, etc. In order to control these and numerous other functions that an MFP typically provides, a user usually accesses and manipulates a control panel on the device. The control panel can include a number of physical buttons or switches and/or a display which may be, in some cases, a touch display through which the user can select functions, settings for those functions, etc. The display can be used to present functions and options and/or settings for those functions through a set of menu selections. The user can navigate through these menus and make selections using the buttons of the control panel or by touching the display if it is a touch sensitive device. Considering the wide range of functions an MFP can perform and the numerous options and settings for each function, navigation through such menus can be a daunting, time-consuming task which can be frustrating and confusing for the user, especially when the user is not familiar with the MFP. Hence, there is a need for improved methods and systems accessing and controlling functions of an MFP.

BRIEF SUMMARY

According to one embodiment, an MFP can comprise a processor and a memory coupled with and readable by the processor. The memory can have stored therein a set of instructions which, when executed by the processor, causes the processor to control functions of the MFP by connecting via a network with one or more servers providing a cloud service and receiving, from the one or more servers, a text or voice message expressed in natural language. The text or voice message can be previously received by the one or more servers from a mobile device of the user of the MFP. Text data or audio data of the received text or voice message can be extracted and forwarded to the one or more servers. In response, one or more entities or intents can be received from the one or more servers. The entities or intents can be related to the text or voice message from the user and can be based on processing of the text data or audio data by the one or more servers. The received one or more entities or intents can be processed to determine one or more functions related to the text or voice message from the mobile device of the user of the MFP and the determined one or more functions can be performed.

According to another embodiment, a system can comprise a mobile device, one or more servers communicatively coupled with the mobile device, and an MFP communicatively coupled with the mobile device and the one or more servers. The mobile device can send a natural language text or voice message to the one or more servers requesting initiation of one or more functions of the MFP. The one or more servers can receive the message from the mobile device, open a connection with the MFP, and forward the natural language text or voice message received from the mobile device to the MFP. The MFP can receive the natural language text or voice message forwarded from the one or more servers, extract text data or audio data of the text or voice message, and forward the extracted text data or audio data of the received text or voice message to the one or more servers. The one or more servers can receive the text data or audio data from the MFP, perform natural language processing on the text data or audio data to generate one or more entities or intents related to the voice or text message, and forward the generated one or more entities or intents to the MFP. The MFP can receive the one or more entities or intents from the one or more servers, process the one or more entities or intents to determine one or more functions related to the text or voice message, and perform the determined one or more functions.

According to yet another embodiment, a method for accessing and controlling functions of an MFP can comprise receiving, by one or more servers, a natural language text or voice message from a mobile device, the text or voice message requesting initiation of one or more functions of the MFP. A connection with the MFP can be opened by the one or more servers and the natural language text or voice message received from the mobile device can be forwarded by the one or more servers to the MFP. The natural language text or voice message from the one or more servers can be received by the MFP. Text data or audio data of the text or voice message can be extracted by the MFP and the extracted text data or audio data of the received text or voice message can be forwarded by the MFP to the one or more servers. The text data or audio data from the MFP can be received by the one or more servers and natural language processing can be performed on the text data or audio data by the one or more servers to generate one or more entities or intents related to the voice or text message. The generated one or more entities or intents can be forward by the one or more servers and received by the MFP. The one or more entities or intents can then be processed to determine one or more functions related to the text or voice message and the determined one or more functions can be performed by the MFP.

Figure 1:
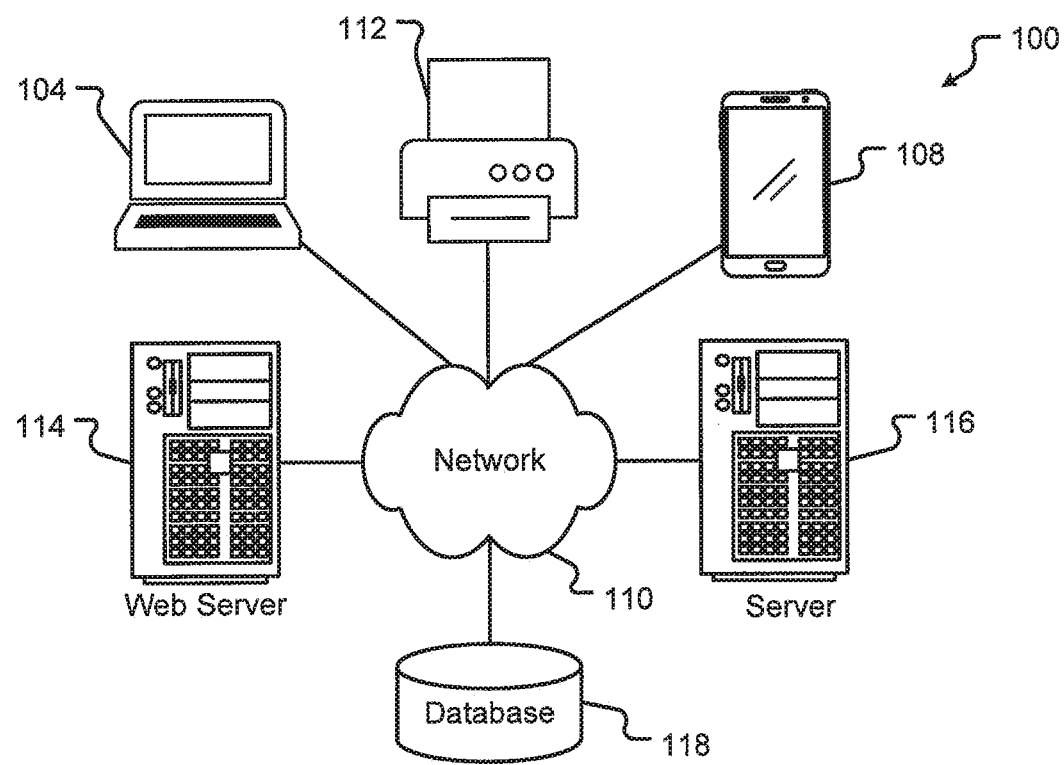
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices 104, 108, and 112, such as a computing device 104, a mobile device 108, and/or Multi-Function Printer (MFP) 112. The computing devices, such as computing device 104, may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. The computing devices 104, 108, and 112 may also have any of a variety of applications, including for example, database client and/or server applications, and web browser applications. Additionally, or alternatively, the computing devices, such as mobile device 108 may be any other electronic device, such as a thin-client computer, Internet-enabled mobile telephone, and/or personal digital assistant, capable of communicating via a network 110 and/or displaying and navigating web pages or other types of electronic documents. MFP 112 can comprise any of a variety of devices offering printing, scanning, copying, faxing, and/or other functions of processing documents. Examples of such devices can include, but are not limited to, the ECOSYS line of MFPs provided by KYOCERA Document Solutions Inc. Although the exemplary computer environment 100 is shown with two computing devices, any number of user computers or computing devices may be supported.

Environment 100 further includes a network 110. The network 110 can be any type of network familiar to those skilled in the art that can support data communications using any of a variety of commercially-available protocols, including without limitation SIP, TCP/IP, SNA, IPX, AppleTalk, and the like. Merely by way of example, the network 110 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP (Session Initiation Protocol) servers, HTTP(s) servers, FTP servers, CGI servers, database servers, Java servers, and the like. In some instances, the web server 114 may publish available operations as one or more web services.

The environment 100 may also include one or more file and/or application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server(s) 116, 114 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 114 or 116 may also include database servers, including without limitation those commercially available from Oracle®, Microsoft®, Sybase®, IBM® and the like, which can process requests from database clients running on a computing device 104, 108, 112.

The web pages created by the server(s) 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer devices 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a storage-area network ("SAN") familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to SQL-formatted commands.

Figure 2:
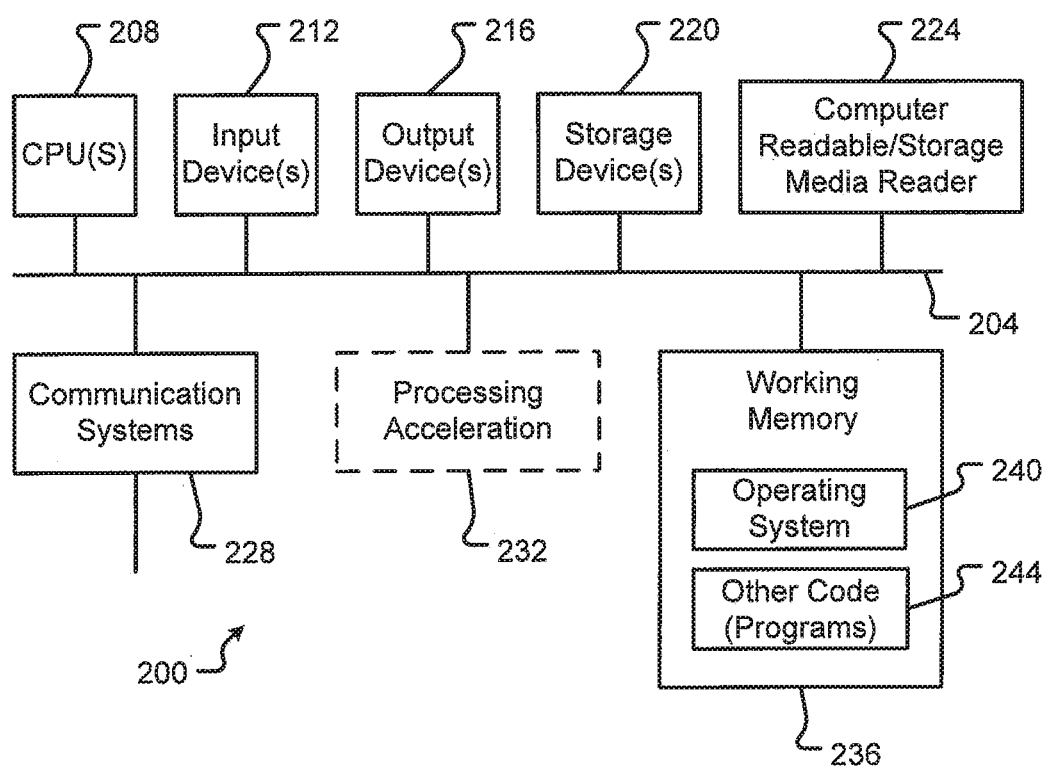
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices 104, 108, and 112, or other systems or components described above may be deployed or executed. The computer system 200 is shown comprising hardware elements that may be electrically coupled via a bus 204. The hardware elements may include one or more central processing units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a random-access memory ("RAM") and/or a read-only memory ("ROM"), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a DSP, a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including read-only memory (ROM), random-access memory (RAM), magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
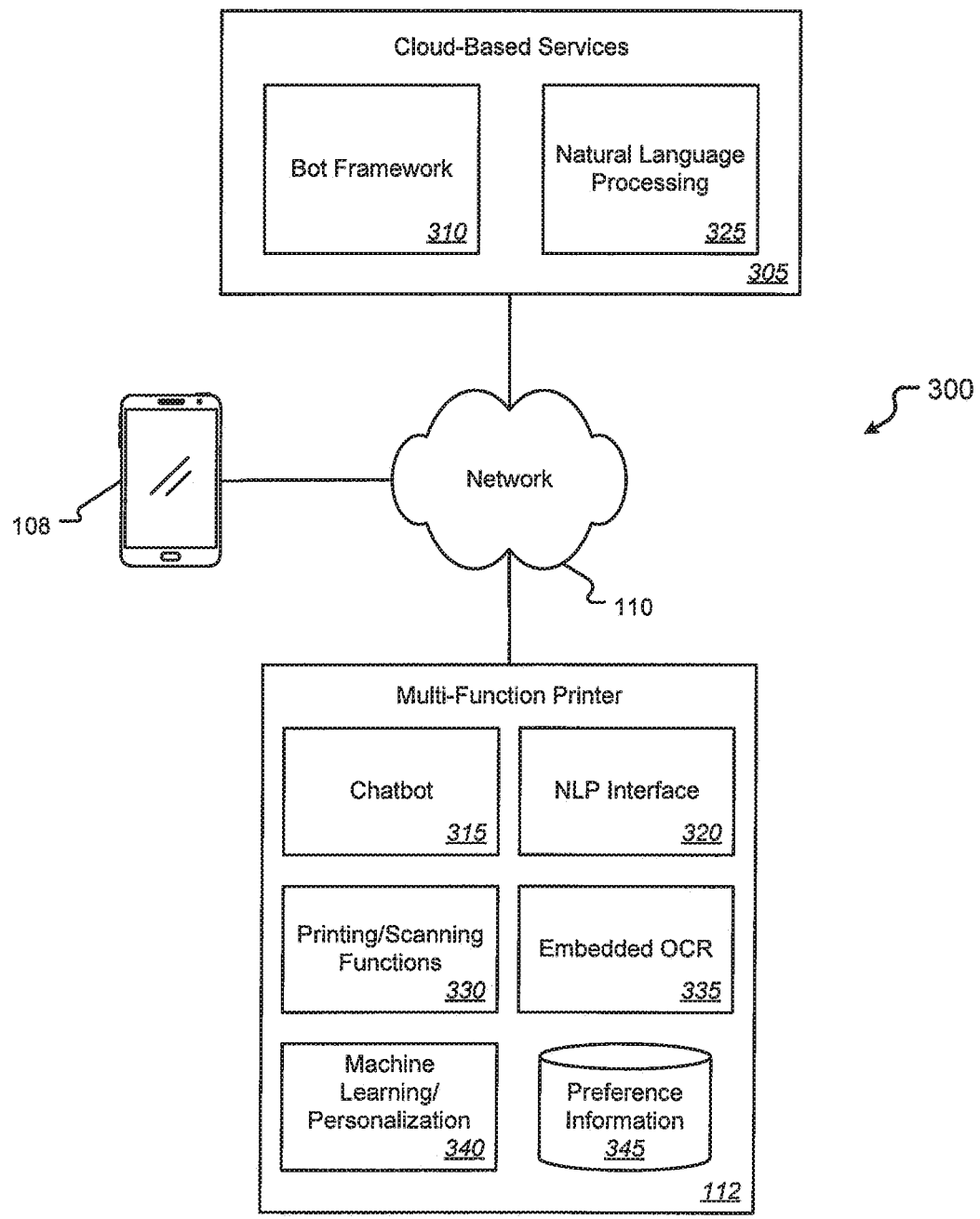
FIG. 3 is a block diagram illustrating components of a system for accessing functions of a multi-function printer according to one embodiment of the present disclosure.

FIG. 3 is a block diagram illustrating components of a system for accessing functions of a multi-function printer according to one embodiment of the present disclosure. As illustrated in this example, the system 300 can include a mobile device 108, communication network 110, and MFP 112 as introduced above. As noted, the mobile device 108 can comprise a cellular telephone, smartphone, tablet, or similar mobile device capable of communicating wirelessly with one or more communication networks to send and receive messages including but not limited to Short Message Service (SMS) and/or Multimedia Message Service (MMS) text messages, Instant Messages (IMs) voice messages, messages directed to or through various social media networks, data-based messages and exchanges, etc. The network 110 can include but is not limited to WiFi, cellular, any one or more wired and/or wireless local-area and wide-area networks, the Internet, etc. As also noted, MFP 112 can comprise any of a variety of devices offering printing, scanning, copying, faxing, and/or other functions of processing documents such as the ECOSYS line of MFPs provided by KYOCERA Document Solutions Inc, for example. The system can also include one or more cloud-based services executing on one or more servers 114 or 116 as described above also coupled with the network 110.

Generally speaking, embodiments of the present disclosure provide for simplified control of the functions of the MFP. Functions of the MFP can include, but are not limited to, any one or more of printing, scanning, copying, faxing, etc. As noted above, the use of the conjunction "or" as used herein is intended to be inclusive and should not be considered to mean or imply a logical exclusive or condition. Rather, any reference made herein to functions of the MFP, such as printing and/or scanning, should be considered to include either or both of these functions as well as any other possible functions provided by the MFP, alone or in combination. Using the mobile device 108 a user can interact with the MFP 112 through a sequence of natural language text and/or voice messages. For example, the user can communicate through the mobile device 108 with the MFP 112 via a chat session, e.g., text message, voice, multiple-choice bubble, etc. Through such a chat session, the user can access functions of the MFP to simplify printing, scanning, etc. so that the user doesn't need to deal with MFP setup or navigate options. Rather, the MFP can provide a personalized print/scan exchange through the chat session by saving previously used options or the most frequently used settings, e.g., duplex, scan-to-Email, etc., and provide personalized recommendations for energy conservation, waste reduction, etc. According to one embodiment, the MFP 112 can also send notifications such as impending toner cartridge replacement, low levels of paper, and error conditions to the user through the mobile device 108.

More specifically, the MFP 112 can further comprise a chatbot 315. As known in the art and as the term is used herein, a chatbot 315 is an application that, when executed by a processor such as found in the MFP 112, can simulate a natural conversation with a human user. The chatbot 315 of the MFP 112 can conduct such a conversation with the user of the MFP 112 over the network 110 and through the mobile device 108 of that user. The conversation can be text-based, e.g., SMS, MMS, IM, or similar messages, or voice-based, e.g., a voice call, and can be directed to accessing and controlling the functions of the MFP 112. In this way, the user can easily and naturally interact with and control the MFP 112 without the need to utilize the typical menu selections and other controls of the MFP 112 and, in some cases, without even being physically present at or near the MFP 112.

The cloud-based services 305 can execute one or more applications supporting these functions. For example, chatbots typically utilize natural language processing to conduct conversations with human users. This processing can be done by the MFP 112 or, in some cases, some or all of this processing may be performed by the cloud-based services 305. Accordingly, the cloud-based services 305 can, according to one embodiment, execute a bot framework 310 and/or one or more Natural Language Processing (NLP) applications 325 or functions. The NLP applications 325 can comprise any one or more applications or functions as known in the art and commonly used for processing and interpreting text data or audio data containing written or spoken expressions in a natural language form. The bot framework 310 can comprise one or more applications, functions, and/or interfaces to support interworking between the chatbot 315 and the NLP applications 325. Similarly, the MFP 112 may include one or more NLP interface 320 functions for interworking with the NLP applications 325 of the cloud-based services 305. In some cases, these functions 320 can pre-process text and/or voice messages, e.g., to extract text data or audio data from received messages and provide that data to the cloud-based services 305 for further processing by the NLP applications 325. It should be understood that, in other implementations, the NLP applications 325 may be executed locally by the MFP 112. In such cases, the cloud-based services 305 may not be implemented or may perform additional or different functions. Regardless of exactly where or how the NLP processing is performed, the chatbot 315 can allow the user to access and control the printing and/or scanning functions 330 of the MFP 112. For example, the user can request through the mobile device 108 the printing and/or scanning functions 330 to retrieve and print a particular document or scan a particular document, perhaps utilizing embedded Optical Character Recognition (OCR) functions 335 of the MFP 112, to a particular email address.

In some cases, these functions 330 may be performed according to or based on a profile or other set of preference information 345 maintained by the MFP 112 for the user. For example, the user may, upon initiation of a chat session with the chatbot 315 of the MFP 112, be asked to provide identifying information, e.g., enter user login information, swipe or scan an ID card, provide biometric information such as a picture for facial recognition, etc. Once the user has been identified, the profile or preference information 345 for that user can be retrieved. This information 345 can comprise, at least in part, a use history for the identified user, e.g., functions performed, settings or options for those functions, context for those functions such as time of day, type of document, etc. This information can be used to provide recommendations unique to the user, provide personalized options and/or settings, anticipate needs, and proactively make suggestions. According to one embodiment, the MFP 112 can also execute one or more machine learning processes 340 for defining and tuning the preference information 345 over time and with each subsequent use. By updating the preference information 345 over time, the MFP 112 can learn each user's preferences and the chatbot 315 can use that information to reconfigure suggested text options to allow for faster and more user-friendly operation of the chat-based MFP interface.

As noted above, the mobile device 108 can comprise a cellphone, smart phone, tablet, or similar device. According to one embodiment, the mobile device 108 may comprise an Augmented Reality (AR) or Virtual Reality (VR) device such a HoloLens or similar headset, glasses, goggles, etc. When wearing or using such a device, the user of the MFP 112 can speak to enter voice commands to control the MFP 112. The chatbot 315 responses can be printed or presented onto the headset display or can be played out in audio/voice form. Therefore, the chatbot 315 of the MFP 112 can receive video or graphic information from the VR or AR device and the one or more function 330 can be performed based on interactions with the user of the MFP 112 through the VR or AR device. In the case that video is received from the VR or AR device, constituent parts of the MFP 112 can be recognized by scanning and matching against a preexisting MFP part database as known in the art. Based on the recognized parts, graphics, video, text, or audio can be provided through the VR or AR device indicating instructions for using the MFP. For example, a beginner or inexperienced user may need assistance on operating the MFP 112. Through the AR or VR device, the chatbot 315 can provide a tour on key features or a quick walk through including voice interaction or short-videos/3D-animation to eliminate confusion.

In these ways, the chatbot 315 can, for example, allow disabled persons to use the MFP 112 through text or voice chat conducted in natural language. As noted above, the use of the conjunction "or" as used herein is intended to be inclusive and should not be considered to mean or imply a logical exclusive or condition. Rather, any reference made herein to text or voice messages should be considered to include either or both of text and/or voice, alone or in combination. For example, visually impaired persons have more difficultly operating traditional MFP interfaces. Such users can speak to the MFP 112 and be understood. Additionally, the MFP 112 can learn each user's habits and personalize interactions to make it more efficient. For example, scheduling or job forwarding can be unique between users, e.g., some users may decide to forward a job to a nearby printer under an error condition. When an error occurs in the future, this user can be offered the option to once again forward to the same, nearby printer. Other customizations can include, but are not limited to, scheduling the printing of a document for the next morning and notifying the user to pick up the document once it is ready or providing a reminder to the user to print or scan certain document(s) based on a calendar entry or other event.

Thus, the chatbot 315, especially when using the preference information 345 and supported by the machine learning processes 340, can be considered a smart personal assistant residing inside the MFP 112. It can improve productivity, eliminate unnecessary actions or procedures, reduce roadblocks, and support environmental awareness. As noted, the chatbot 315 can provide personalization by identifying the user and suggesting certain settings based on past history for that user. Through the chatbot 315 and based on the history and other information, the MFP 112 can also predict and anticipate needs and suggest next operation, etc. The chatbot 315 can also provide reminders or notifications on certain conditions such as toner change, low level of paper, or error conditions.

It should be noted and understood that while only one MFP 112, mobile device 108, and cloud-based service 305 are illustrated and described here for the sake of brevity and clarity, any number of such components may be used in any particular implementation. For example, in an office environment where an MFP 112 according to embodiments of the present disclosure can typically be found, multiple users can share such a device. Therefore, any number of mobile devices 108 may be present and can interact with the MFP 112 as described above. Similarly, such an environment may include more than one MFP 112 and each mobile device 108 may be able to interact with each MFP 112 or may be limited to interacting with only one or a few MFPs 112 for which the user associated with that mobile device 108 is authorized. In various implementations, any number of mobile devices 108 and MFPs 112 may utilize one or more cloud-based services 305 or, as noted above, the natural language processing 325 and other functions of the cloud-based services 305 may be fully implemented in each MFP 112 without relying on such remote services 305. When utilized, the cloud-based services 305 and servers providing those services 305 may be physically and/or logically organized and distinguished, for example, based on models or types of MFPs supported, languages supported, geographic regions or customers supported, or any of a number of other factors upon which the servers and other resources of the cloud-based services 305 may be distributed and the workloads of resources may be balanced. Numerous other variations are contemplated and considered to be within the scope of the present disclosure.

Figure 4:
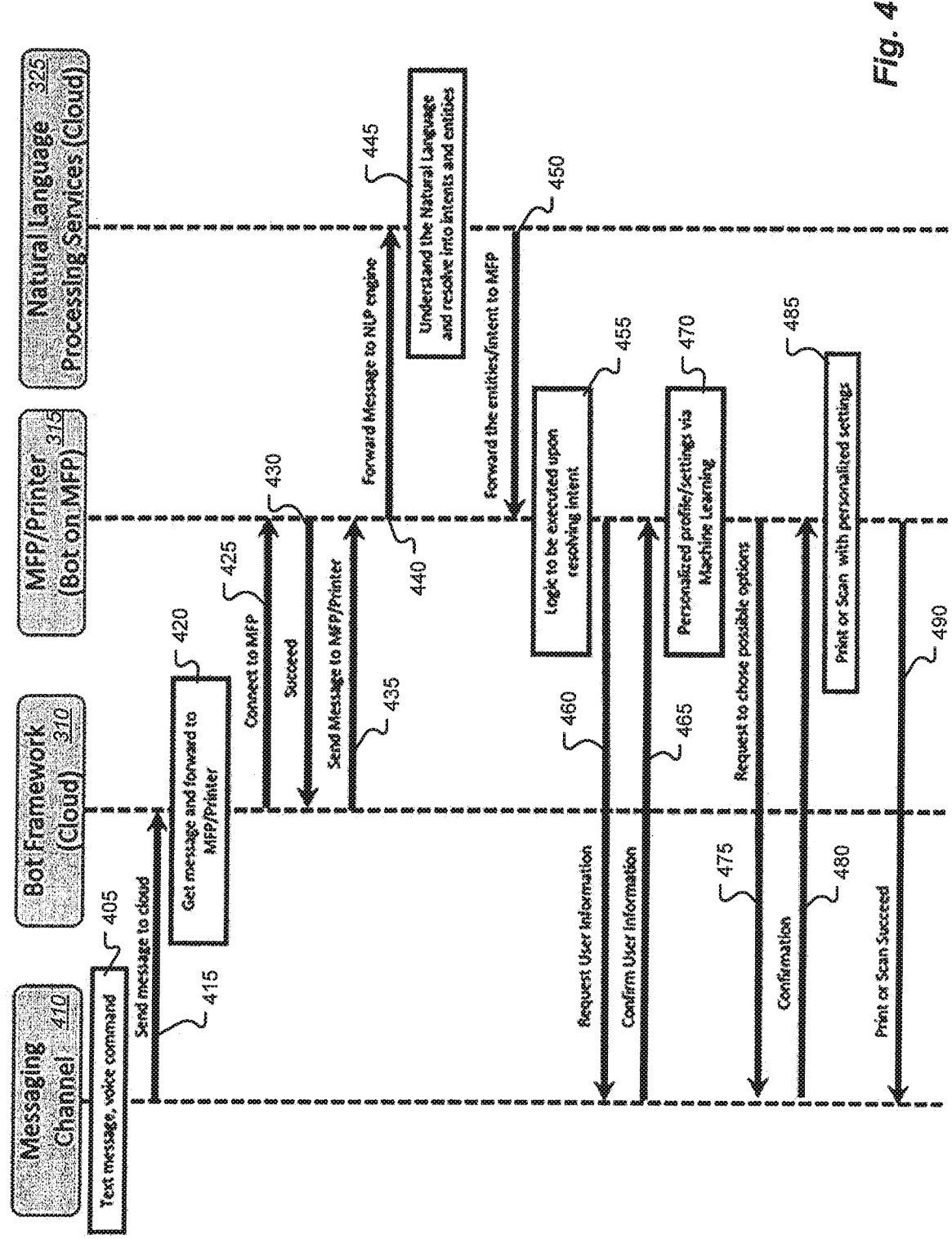
FIG. 4 is a timing diagram illustrating an exemplary process for accessing functions of a multi-function printer according to one embodiment of the present disclosure.

FIG. 4 is a timing diagram illustrating an exemplary process for accessing functions of a multi-function printer according to one embodiment of the present disclosure. At step 405, as illustrated in this example, accessing functions of a multi-function printer can begin with a text or voice message on a messaging channel 410, e.g., sent from the mobile device 108 over the network 110. At step 415, the message can be sent to the cloud-based services 305. At step 420, the message can be received by the bot framework 310 as described. At step 425, the bot framework can then open a connection with the MFP 112, e.g., by sending a connection message to the MFP. At step 430, the MFP 112 can reply with an acknowledgement or other success message once the connection is established. At step 435, the bot framework can then send the received message to the chatbot 315 of the MFP 112.

The chatbot 315 can receive the text or voice message sent from the bot framework 310 of the cloud-based services 305 and process the message in a variety of different ways depending upon the exact implementation. At step 440, according to one embodiment, the chatbot 315 can forward the received message to the NLP applications 325 of the cloud-based services 305. In another embodiment, the chatbot 315 may perform some amount of processing on the received text or voice message such as, for example, extracting portions of text data or audio data from the message, before forwarding those portions to the NLP applications 325. In yet other embodiments, the MFP 112 may perform all NLP processing locally and thus, the text or voice message or text or audio data from the message does not need to be forwarded to NLP application 325 elsewhere.

At step 445, the NLP applications 325 can perform processing to understand the natural language expressed in the forwarded message and resolve the natural language into intents and entities. As known in the art and as used herein, intents can comprise information identifying an action the user wishes to perform or request, e.g., a command to be initiated, a function to be performed, etc. Also as known in the art and as used herein, entities can comprise information identifying, defining, or clarifying a subject of or context for an intent. So, for example, an intent can be "Print" and an entity might be "Document1." In another example, an intent can be "Scan" and an entity can comprise "To email" and possibly with another entity identifying an email address. Any of a variety of NLP techniques as known in the art can be used to recognize intents and entities expressed in the text data or audio data received from the MFP. At step 450, the entities and intents determined by the NLP applications 325 can then be forwarded to the chatbot 315 of the MFP 112.

At step 455, the MFP 112 can execute logic on the entities and intents. For example, a function of the MFP 112 related to an identified intent can be initiated with parameters related to one or more identified entities. At step 460, as part of this logic, and according to one embodiment, the chatbot 315 may request user information through the messaging channel 410, i.e., by sending a text or voice message over the network 110 to the mobile device 108 of the user. At step 465, this user information can be provided by the user through the mobile device 108 in response to the request from the chatbot 315. This information can comprise, for example, user login information or similar information that can be used to uniquely identify the user.

At step 470, the MFP 112 can select one or more personal settings, functions, or options for the requested function based on the user information received by the chatbot 315 from the mobile device 108. For example, the user information may be used to look up or identify preference information and/or history information in a user profile for the identified user. According to one embodiment, this information can be further based on machine learning processes performed on previous settings, functions, or options selected by the identified user of the MFP. At step 475, an indication of the personalized settings, functions, or options for using the MFP can be provided by the chatbot 315 to the user through the messaging channel 410. At step 480, the user can in turn provide a confirmation of that information to the chatbot 315. At step 485, once the settings, functions, or options are confirmed, the MFP 112 can then perform the functions using the confirmed personalized settings. At step 490, a notification 490 of completion can be sent by the chatbot 315 to the user through the messaging channel 410.

Figure 5:
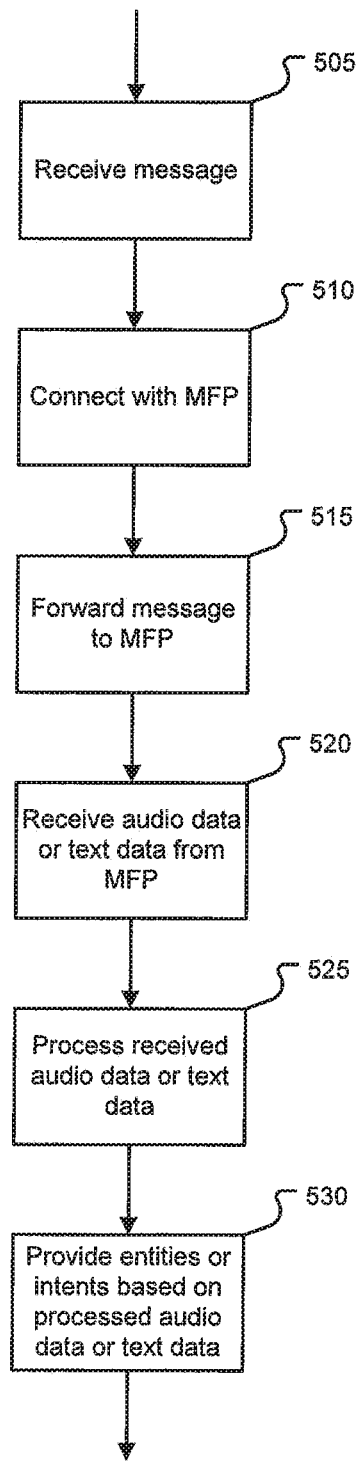
FIG. 5 is a flowchart illustrating exemplary cloud service processes for supporting access to functions of a multi-function printer according to one embodiment of the present disclosure.

FIG. 5 is a flowchart illustrating exemplary cloud service processes for supporting access to functions of an MFP according to one embodiment of the present disclosure. At step 505, as illustrated in this example, the one or more servers of the cloud service introduced above can receive a message from a mobile device. The message can comprise a natural language text or voice message to the one or more servers requesting initiation of one or more functions of the MFP. At step 510, and in response to receiving the message, the servers can open a connection with the MFP. At step 515, the server can forward the natural language text or voice message received from the mobile device to the MFP.

As noted above and as will be described further below, the MFP can extract and return text data or audio data of the text or voice message. Generally speaking, text data can comprise, for example, a text string corresponding to and including a command or request for functions of the MFP. Similarly, audio data can comprise an audio clip corresponding to and including such a command or request. At step 520, the one or more servers can receive the text data or audio data from the MFP. At step 525, the one or more servers can perform natural language processing on the text data or audio data to generate one or more entities or intents related to the voice or text message. At step 530, the one or more servers can forward or otherwise provide the generated one or more entities or intents to the MFP.

As introduced above, intents can comprise information identifying an action the user wishes to perform or request, e.g., a command to be initiated, a function to be performed, etc., while entities can comprise information identifying, defining, or clarifying a subject of or context for an action. So, for example, an intent can be "Print" and an entity might be "Document1." In another example, an intent can be "Scan" and an entity can comprise "To email" and possibly with another entity identifying an email address. Also as known in the art, any of a variety of NLP techniques can be used to recognize intents expressed in the text data or audio data received from the MFP. For example, a trained neural network that maps words and phrases to ideas or topics may be utilized by the servers of the cloud service to identify an intent. Similarly, any of a variety of known techniques can be utilized for recognizing entities. For example, the servers can use a statistical model built on a training set and refined using machine learning processes and that represents a mapping of words and phrases to categories, types, classifications, etc. used to assign entities.

Figure 6:
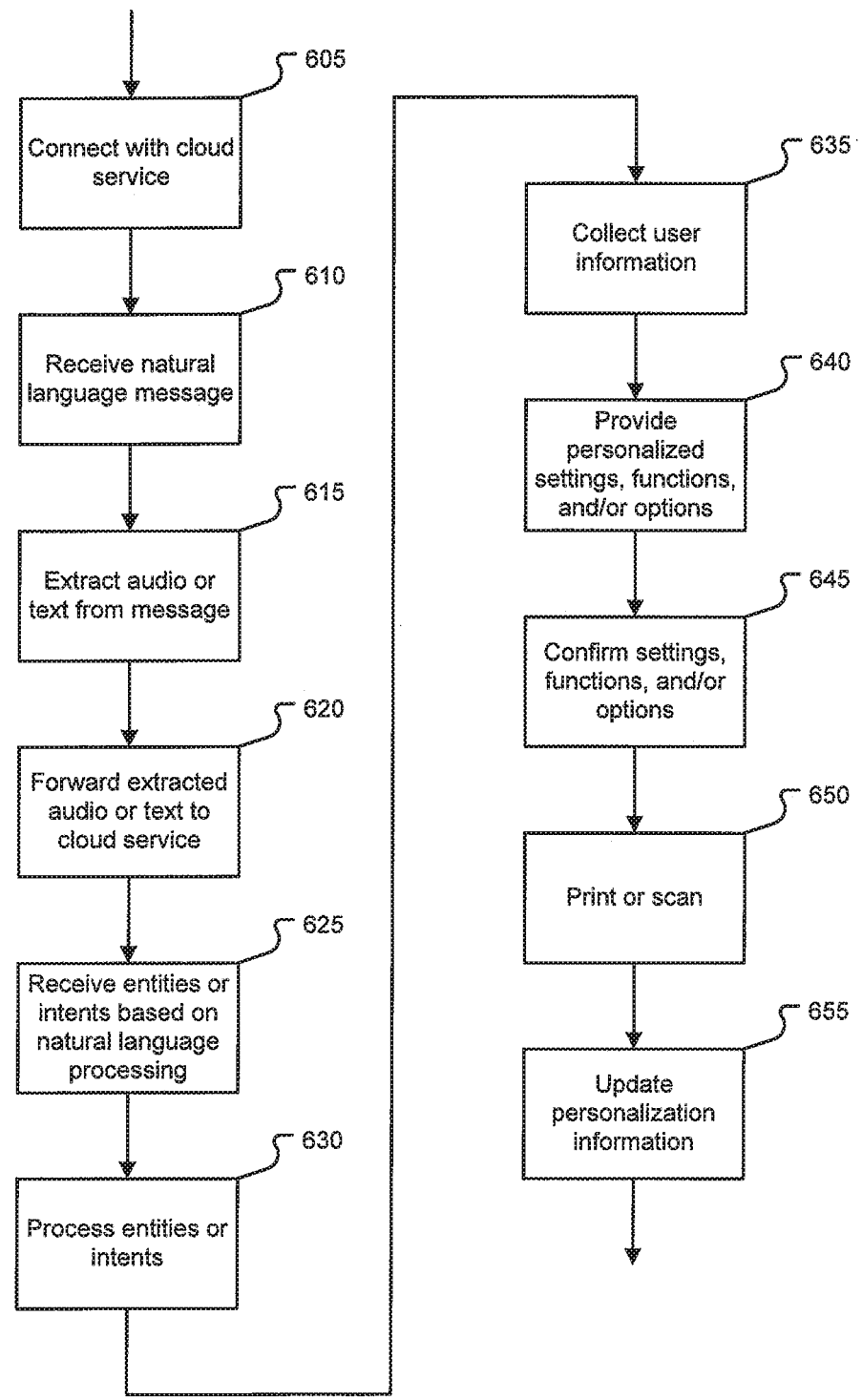
FIG. 6 is a flowchart illustrating exemplary local processes for accessing functions in a multi-function printer according to one embodiment of the present disclosure.

FIG. 6 is a flowchart illustrating exemplary local processes for accessing functions in an MFP according to one embodiment of the present disclosure. At step 605, accessing and controlling functions of the MFP can begin with connecting the MFP via a network with one or more servers providing a cloud service as described above. At step 610, once connected, a text or voice message expressed in natural language can be received from the one or more servers. As noted, the text or voice message can be received by the one or more servers from a mobile device of the user of the MFP and can include a natural language expression requesting access to or control of the printing and/or scanning functions of the MFP. At step 615, text data or audio data of the received text or voice message can be extracted from the message. At step 620, the extracted text data or audio data of the received text or voice message can be forwarded to the one or more servers for further processing. That is, portions of the natural language expression in the received text or voice message can be identified as relevant and/or particularly directed to access to or control of the printing and/or scanning functions of the MFP. This identification can be based, for example, on searching text, if any, of the received message for particular, predefined keywords, characters, or other indications of commands or requests to the MFP. Similarly, pre-processing of a voice message can comprise identifying keywords or utterances predefined as indicating a command or request to the MFP. Once identified, the corresponding text data, e.g., a text string corresponding to and including the command or request, or audio data, e.g., an audio clip corresponding to and including the command or request, can be copied or otherwise extracted from the received message and provided to the servers for further natural language and/or other processing.

At step 625, and in response to the text data or audio data forwarded to the servers, the MFP can receive one or more entities and/or intents related to the text or voice message. As described above, the entities and/or intents can be based on natural language processing of the text data or audio data by the one or more servers. As noted, intents can comprise information identifying an action the user wishes to perform or request, e.g., a command to be initiated, a function to be performed, etc., while entities can comprise information identifying, defining, or clarifying a subject of or context for an action. So, for example, an intent can be "Print" and an entity might be "Document1." At step 630, the received one or more entities and/or intents can be processed to determine one or more functions related to the text or voice message from the mobile device of the user of the MFP. The determined one or more functions can then be performed.

At step 635, performing the one or more functions can further comprise collecting user information for the user of the MFP through the mobile device of the user of the MFP. For example, the user can be queried or prompted, through the mobile device, for a username, password, credential, and/or other identifying information that can be used, for example, to uniquely identify, authenticate, and/or authorize that user. At step 640, an indication of one or more personalized settings, functions, or options for using the MFP can be provided based on the collected user information. For example, providing the indication of one or more personalized settings, functions, or options for using the MFP can comprise identifying the user of the MFP based on the collected user information and selecting the one or more personal settings, functions, or options for using the MFP from a history, profile, or similar information. This information can be based on machine learning processes performed on previous settings, functions, or options selected by the identified user of the MFP. Providing the indication of one or more personalized settings, functions, or options for using the MFP can comprise presenting these options to the user through the mobile device, e.g., through a menu, chat dialog, etc. At step 645, confirmation of one or more of the personal settings, functions, or options or a request for one or more different settings, functions, or options can be received from the mobile device of the user.

At step 650, once the settings, functions, and/or options have been selected, performing the one or more functions can continue with one or more documents based on the confirmed one or more of the personal settings, functions, or options or the request for one or more different settings, functions, or options. At step 655, performing the one or more functions can further comprise performing the machine learning processes based on the confirmed one or more of the personal settings, functions, or options or the request for one or more different settings, functions, or options. That is, a history, profile, or similar information for the user can be updated with the confirmed selections or request for different selections and a model for making such selections, weights applied to criteria for making these selections, or other factors can be updated or adjusted based on user's confirmation or selections, the context in which they are made, inferences drawn therefrom, etc. according to a variety of known machine learning processes in order to improve selection of settings, functions, or options for future print, scan, or other jobs from the user.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:
1. A Multi-Function Printer (MFP) comprising:
a processor; and
a memory coupled with and readable by the processor and having stored therein a set of instructions which, when executed by the processor, causes the processor to control functions of the MFP by:
connecting via a network with one or more servers providing one or more cloud-based services, the one or more cloud-based services including a first service executing a bot framework service on a first server and a second service executing a natural language processing service on a second server different from the first server;
receiving, from the one or more servers executing the first service, a text or voice message expressed in natural language and received by the one or more servers from a mobile device of the user of the MFP;
extracting text data or audio data of the received text or voice message;
forwarding the extracted text data or audio data of the received text or voice message to the one or more servers executing the second service;
receiving, from the one or more servers executing the second service, one or more entities or intents related to the text or voice message from the user based on processing of the text data or audio data by the one or more servers executing the second service;
processing the received one or more entities or intents to determine one or more functions related to the text or voice message from the mobile device of the user of the MFP; and
performing the determined one or more functions.

2. The MFP of claim 1, wherein performing the one or more functions further comprises:
collecting user information for the user of the MFP through the mobile device of the user of the MFP; and
providing, based on the collected user information, an indication of one or more personalized settings, functions, or options for using the MFP.

3. The MFP of claim 2, wherein providing the indication of one or more personalized settings, functions, or options for using the MFP further comprises:
identifying the user of the MFP based on the collected user information; and
selecting the one or more personal settings, functions, or options for using the MFP based on machine learning processes performed on previous settings, functions, or options selected by the identified user of the MFP.

4. The MFP of claim 3, wherein providing the indication of one or more personalized settings, functions, or options for using the MFP further comprises receiving from the mobile device of the user of the MFP confirmation of one or more of the personal settings, functions, or options or a request for one or more different settings, functions, or options.

5. The MFP of claim 4, wherein performing the one or more functions further comprises printing or scanning one or more documents based on the one or more of the personal settings, functions, or options or the request for one or more different settings, functions, or options.

6. The MFP of claim 4, wherein performing the one or more functions further comprises performing the machine learning processes based on the confirmed one or more of the personal settings, functions, or options or the request for one or more different settings, functions, or options and wherein performing the machine learning processes updates a model influencing selection of setting, functions, or options for future text or voice messages from the user of the MFP.

7. The MFP of claim 1, wherein the mobile device of the user of the MFP comprises a virtual reality or augmented reality device, wherein receiving the text or voice message from the user of the MFP further comprises receiving video or graphic information from the virtual reality or augmented reality device, and wherein performing the one or more functions further comprises interacting with the user of the MFP through the virtual reality or augmented reality device.

8. The MFP of claim 7, wherein interacting with the user of the MFP comprises providing graphics, video, text, or audio indicating one or more personalized settings, functions, or options for using the MFP or instructions for using the MFP to the user of the MFP through the virtual reality or augmented reality device.

9. A system comprising:
a mobile device;
one or more servers communicatively coupled with the mobile device, the one or more servers providing one or more cloud-based services including a first service executing a bot framework service on a first server and a second service executing a natural language processing service on a second server different from the first server; and
a Multi-Function Printer (MFP) communicatively coupled with the mobile device and the one or more servers, wherein:
the mobile device sends a natural language text or voice message to the one or more servers executing the first service requesting initiation of one or more functions of the MFP,
the one or more servers executing the first service receive the message from the mobile device, open a connection with the MFP, and forward the natural language text or voice message received from the mobile device to the MFP,
the MFP receives the natural language text or voice message forwarded from the one or more servers executing the first service, extracts text data or audio data of the text or voice message, and forwards the extracted text data or audio data of the received text or voice message to the one or more servers executing the second service,
the one or more servers executing the second service receive the text data or audio data from the MFP, perform natural language processing on the text data or audio data to generate one or more entities or intents related to the voice or text message, and forward the generated one or more entities or intents to the MFP, and
the MFP receives the one or more entities or intents from the one or more servers executing the second service, processes the one or more entities or intents to determine one or more functions related to the text or voice message, and performs the determined one or more functions.

10. The system of claim 9, wherein performing the one or more functions further comprises:
collecting, by the MFP through the mobile device, user information for a user of the MFP; and
providing, by the MFP through the mobile device, an indication of one or more personalized settings, functions, or options for using the MFP based on the collected user information.

11. The system of claim 10, wherein providing the indication of one or more personalized settings, functions, or options for using the MFP further comprises:
identifying the user of the MFP based on the collected user information; and selecting the one or more personal settings, functions, or options for using the MFP based on machine learning processes performed on previous settings, functions, or options selected by the identified user of the MFP.

12. The system of claim 11, wherein the MFP receives from the mobile device confirmation of one or more of the personalized settings, functions, or options or a request for one or more different settings, functions, or options.

13. The system of claim 12, wherein the MFP prints or scans one or more documents based on the one or more of the personal settings, functions, or options or the request for one or more different settings, functions, or options.

14. The system of claim 13, wherein one or both of the MFP or one or more servers perform the machine learning processes based on the confirmed one or more of the personal settings, functions, or options or the request for one or more different settings, functions, or options.

15. The system of claim 9, wherein the mobile device comprises a virtual reality or augmented reality device, wherein the MFP receives video or graphic information from the virtual reality or augmented reality device, and wherein performing the one or more functions further comprises interacting with a user of the MFP through the virtual reality or augmented reality device.

16. The system of claim 15, wherein interacting with the user of the MFP comprises providing graphics, video, text, or audio indicating the one or more personalized settings, functions, or options for using the MFP or instructions for using the MFP to the user of the MFP through the virtual reality or augmented reality device.

17. A method for accessing and controlling functions of a Multi-Function Printer (MFP), the method comprising:
    receiving, by one or more servers executing a bot framework service on a first server, a natural language text or voice message from a mobile device, the text or voice message requesting initiation of one or more functions of the MFP;
    opening, by the one or more servers executing the bot framework service, a connection with the MFP;
    forwarding, by the one or more servers executing the bot framework service, the natural language text or voice message received from the mobile device to the MFP;
    receiving, by the MFP, the natural language text or voice message from the one or more servers executing the bot framework service;
    extracting, by the MFP, text data or audio data of the text or voice message;
    forwarding, by the MFP to one or more servers executing a natural language processing service on a second server different from the first server, the extracted text data or audio data of the received text or voice message;
    receiving, by the one or more servers executing the natural language processing service, the text data or audio data from the MFP;
    performing, by the one or more servers executing the natural language processing service, natural language processing on the text data or audio data to generate one or more entities or intents related to the voice or text message;
    forwarding, by the one or more servers executing the natural language processing service, the generated one or more entities or intents to the MFP;
    receiving, by the MFP, the one or more entities or intents from the one or more servers executing the natural language processing service;
    processing, by the MFP, the one or more entities or intents to determine one or more functions related to the text or voice message; and
    performing, by the MFP, the determined one or more functions.

18. The method of claim 17, wherein performing the determined one or more functions further comprises:
    collecting, by the MFP through the mobile device, user information for a user of the MFP;
    identifying the user of the MFP based on the collected user information;
    selecting one or more personal settings, functions, or options for using the MFP based on machine learning processes performed on previous settings, functions, or options selected by the identified user of the MFP; and
    providing, by the MFP through the mobile device, an indication of the selected one or more personalized settings, functions, or options for using the MFP.

19. The method of claim 18, wherein performing the determined one or more functions further comprises receiving confirmation of the one or more of the personal settings, functions, or options or a request for one or more different settings, functions, or options.

20. The method of claim 19, wherein performing the determined one or more functions further comprises:
    printing or scanning one or more documents based on the one or more of the personal settings, functions, or options or the request for one or more different settings, functions, or options; and
    performing machine learning based on the confirmed one or more of the personal settings, functions, or options or the request for one or more different settings, functions, or options.

* * * * *